(12) United States Patent
Kumagai et al.

(10) Patent No.: US 6,404,981 B1
(45) Date of Patent: Jun. 11, 2002

(54) DATA RECORDING APPARATUS AND CAMERA APPARATUS

(75) Inventors: Atsuhiro Kumagai, Kanagawa; Satoshi Kato, Aichi, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/090,289

(22) Filed: Jun. 4, 1998

(30) Foreign Application Priority Data

Jun. 9, 1997 (JP) .............................................. 9-151302

(51) Int. Cl.⁷ .............................................. H04N 5/781
(52) U.S. Cl. ........................ 386/125; 386/117; 348/373; 360/75; 360/69; 360/60
(58) Field of Search ................................. 386/125–126, 386/117, 46, 1, 38, 45; 360/60, 75, 75 H, 69; 348/231–233, 373; 358/906, 909.1; 310/336, 338; 73/310, 493, 510; H04N 5/781

(56) References Cited

U.S. PATENT DOCUMENTS

| | | | | |
|---|---|---|---|---|
| 4,040,103 A | * | 8/1977 | White .......................... | 360/75 |
| 4,862,298 A | * | 8/1989 | Genheimer et al. ........... | 360/60 |
| 5,138,459 A | * | 8/1992 | Roberts et al. ............. | 348/232 |
| 5,227,929 A | * | 7/1993 | Comerford .................. | 360/75 |
| 5,235,472 A | * | 8/1993 | Smith .......................... | 360/60 |
| 5,956,194 A | * | 9/1999 | Ohmi et al. .................. | 360/60 |
| 5,982,573 A | * | 11/1999 | Henze ......................... | 360/75 |

FOREIGN PATENT DOCUMENTS

JP              406275002    *   9/1994   ............... 360/75 H

* cited by examiner

Primary Examiner—Vincent Boccio
(74) Attorney, Agent, or Firm—Lerner, David, Littenberg, Krumholz & Mentlik, LLP (57) ABSTRACT

A data recording device and a camera device in which, while using a disc drive not employing tracking servo, destruction of recorded data is prevented against an impact applied during data recording. The data recording device or a camera device includes a recording unit 32 for recording data on the disc-shaped recording medium without employing tracking servo provided in the inside of a casing, an acceleration sensor 33 for detecting an impact applied to the casing and a control unit 28, 31, 36 for controlling the recording unit for discontinuing data recording on the disc-shaped recording medium if an impact exceeding a pre-set value is detected based on detection results from the acceleration sensor 33. By discontinuing data recording on the disc-shaped recording medium on detection by the acceleration sensor 33 of an impact exceeding a pre-set value, it becomes possible to prevent destruction of recorded data on the disc-shaped recording medium and failure in recording.

10 Claims, 9 Drawing Sheets

DATA RECORDING APPARATUS AND CAMERA APPARATUS

BACKGROUND OF THE INVENTION

1. Field of the Invention

This invention relates to a data recording apparatus and a camera apparatus used with advantage for digitizing and recording a picture.

2. Related Art

There have recently investigated using a so-called removable disc-shaped recording medium in electronic apparatus for data recording/reproduction. The portable electronic apparatus are subjected during its use to external force such as vibrations or impacts or to abrupt changes in temperature or humidity. In portable electronic apparatus used under these hostile environments, there are occasions wherein the disc drive for recording/reproducing data on or from the loaded disc-shaped recording medium is loaded such that data cannot be recorded/reproduced in accordance with the pre-set format due to the above-mentioned extraneous factors.

In the portable electronic apparatus in particular, there are occasions wherein strong impacts are instantaneously applied from outside to the casing during use thus causing so-called detracking of the recording head. Therefore, means must be provided for preventing data already recorded in neighboring tracks of the disc-shaped recording medium from being eroded during data recording by the detracking or preventing failure in data writing in the current track.

In a hard disc drive, for example, there is formed a servo pattern on the hard disc surface, such that detracking is found to have occurred as a result of disengagement of the tracking servo. Thus, the device itself can inherently detect such detracking.

However, if a disc drive not employing tracking servo such as a floppy disc drive is used in the portable electronic apparatus, it is problematic the device itself can not inherently detect such detracking.

If, in the floppy disc drive, the magnetic head is deviated in an amount exceeding approximately 60 $\mu$m, data already recorded on the neighboring track of the loaded floppy disc is affected by this head deviation. In a majority of cases, this phenomenon is known to occur if a strong impact is applied to the floppy disc drive from outside.

SUMMARY OF THE INVENTION

It is therefore an object of the present invention to provide a portable data recording apparatus in which, while using a disc drive not employing tracking servo, destruction of the recorded data or recording failure can be prevented against impacts induced during data recording.

It is another object of the present invention to provide a camera apparatus in which, while using a disc drive not employing tracking servo, destruction of the recorded data or recording failure can be prevented against impacts induced during data recording.

In one aspect, the present invention provides a portable data recording device for recording data on a disc-shaped recording medium including recording means for recording data on the disc-shaped recording medium without employing tracking servo provided in the inside of a casing, an acceleration sensor for detecting an impact applied to the casing and control means for controlling the recording means for discontinuing data recording on the disc-shaped recording medium if an impact exceeding a pre-set value is detected based on detection results from the acceleration sensor.

By discontinuing data recording on the disc-shaped recording medium on detection by the acceleration sensor of an impact exceeding a pre-set value, it becomes possible to prevent destruction of recorded data on the disc-shaped recording medium or failure in recording.

In another aspect, the present invention provides a camera device for recording data on a disc-shaped recording medium including recording means for recording data on the disc-shaped recording medium without employing tracking servo provided in the inside of a casing, an acceleration sensor for detecting an impact applied to the casing and control means for controlling the recording means for discontinuing data recording on the disc-shaped recording medium if an impact exceeding a pre-set value is detected based on detection results from the acceleration sensor.

By discontinuing data recording on the disc-shaped recording medium on detection by the acceleration sensor of an impact exceeding a pre-set value in the camera device of the present invention, it becomes possible to prevent destruction of recorded data on the disc-shaped recording medium or failure in recording. Thus, in the portable recording device employing a disc drive devoid of tracking servo, the recorded data can be protected against impact, while the failure of recording can be eliminated.

Moreover, by discontinuing data recording on the disc-shaped recording medium on detection by the acceleration sensor of an impact exceeding a pre-set value in the camera device of the present invention, it becomes possible to prevent destruction of recorded data on the disc-shaped recording medium and failure in recording. Thus, in the camera device employing a disc drive devoid of tracking servo, the recorded data can be protected against impact, while the failure of recording can be eliminated.

DESCRIPTION OF PREFERRED EMBODIMENTS

Figure 1:
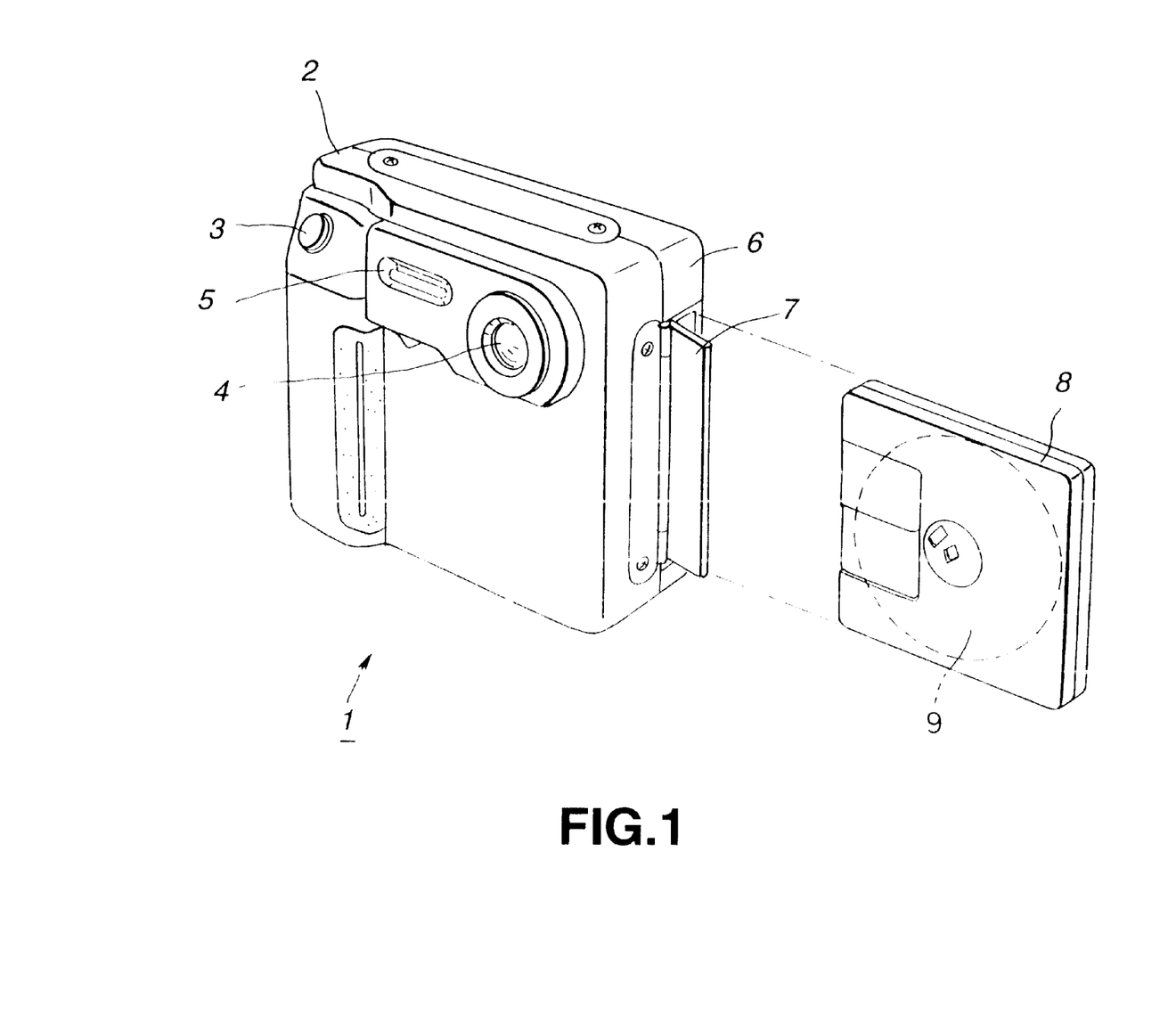
FIG. 1 is a perspective view from the front side for illustrating the structure of the digital camera apparatus embodying the present invention.

Referring to the drawings, preferred embodiments of the present invention will be explained in detail. A digital camera device 1, embodying the present invention, is of a portable size and a substantially parallelepipedic shape, as shown in FIG. 1 showing the appearance of the device from the front side. In the present digital camera device 1, a shutter button 3, an objective lens 4 and a flash device 5 are mounted on an upper portion of a casing 2. The shutter button 3 can be pressed with an index finger of the user's right hand.

Figure 2:
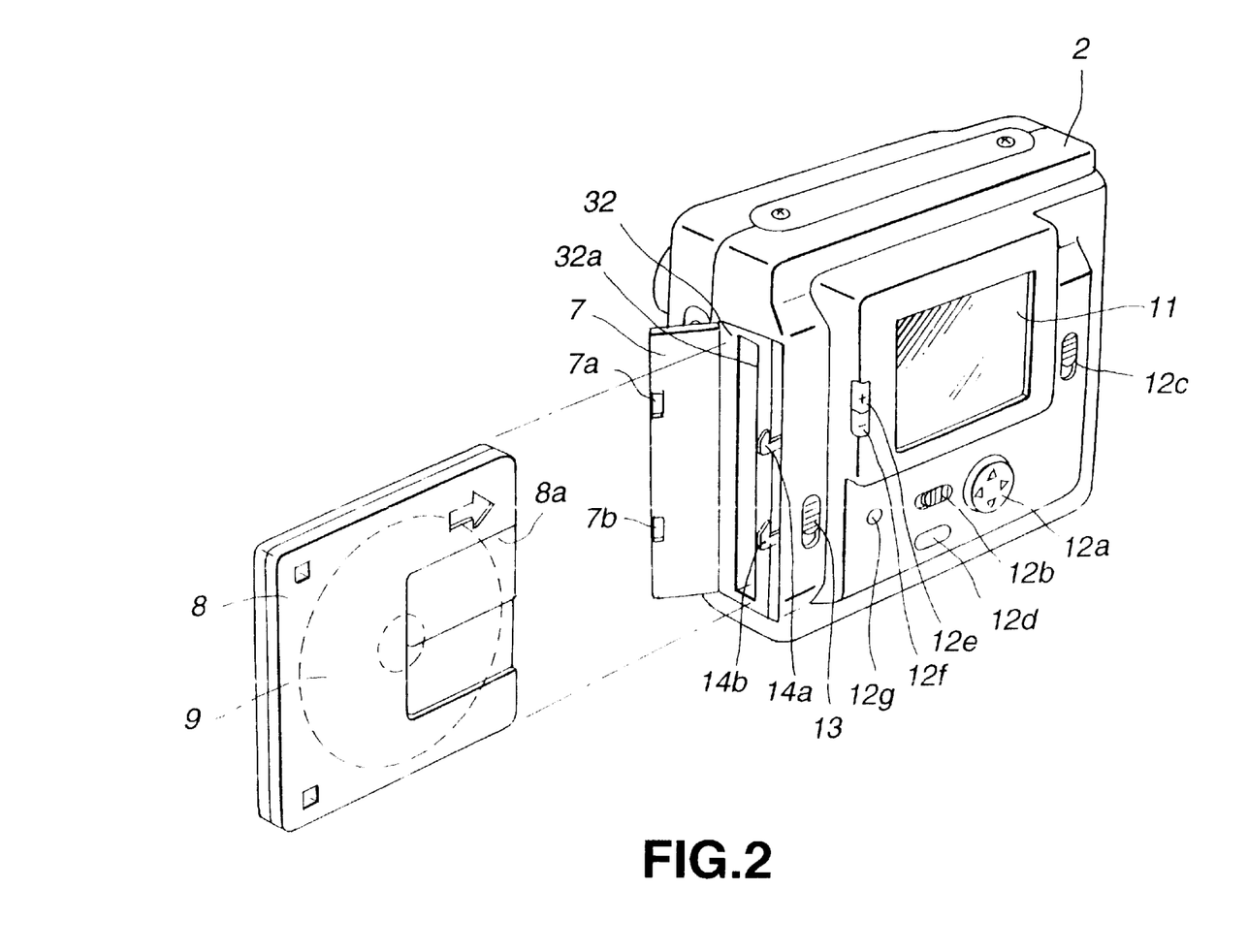
FIG. 2 is a perspective view from the back side for illustrating the structure of the digital camera apparatus.

On a lateral surface 6 of the casing 2 of the digital camera device 1 is mounted an opening/closing lid 7. From the lateral surface 6, a floppy disc cartridge 8 holding a floppy magnetic disc 9 of the size of 3.5 inch can be loaded into the inside of the casing 2. This floppy magnetic disc 9 is referred to herein simply as a magnetic disc 9. Specifically, as shown in FIG. 2 showing the appearance from the back side of the digital camera device 1, there is arranged in the inside of the casing 2 a floppy disc drive 32 which will be explained subsequently in detail. The floppy disc cartridge 8 is inserted via a cartridge inserting opening 32a of the floppy disc drive 32 from the side of a shutter 8a.

On the back side of the casing 2 of the digital camera device 1 is mounted a Liquid Crystal Display panel (LCD panel) 11 on which an object is displayed during photographing. If, in the digital camera device 1, the object is photographed by pressing the shutter button 3, there are recorded on a magnetic disc 9 in the floppy disc cartridge 8 loaded on the floppy disc drive 32 picture data of the object (main picture data) and thumbnail picture data operating as an index for the main picture data, During reproduction of the main picture data after photographing the object, a thumbnail picture for thumbnail picture data recorded on the magnetic disc 9 is displayed for a pre-set number of pictures, such as six pictures, on the LCD display 11. If a particular one of the thumbnail pictures is designated, the main picture data corresponding to the thumbnail picture are read out from the magnetic disc 9 so as to be displayed n the LCD panel 11.

The digital camera device 1 can erase unneeded main picture data and the thumbnail picture data recorded on the magnetic disc 9 or change the arraying manner of the thumbnail pictures displayed on the LCD panel 11, by way of a variety of editing operations.

That is, in the present digital camera device 1, a variety of actuating buttons/switches 12a, 12b, 12c, 12d, 12e, 12f and 12g are arranged around the LCD panel 11. By actuating these operating buttons, zooming during photographing, designation of particular thumbnail pictures during reproduction or data erasure can be performed by way of editing operations.

The opening/closure of the opening/closing lid 7 can be achieved by vertically moving an opening/closure actuator 13 for canceling or holding the engaged state of engagement pawls 14a, 14b interlocked with the opening/closure actuator 13 with engagement portions 7a, 7b of the opening/closing lid 7.

Figure 3:
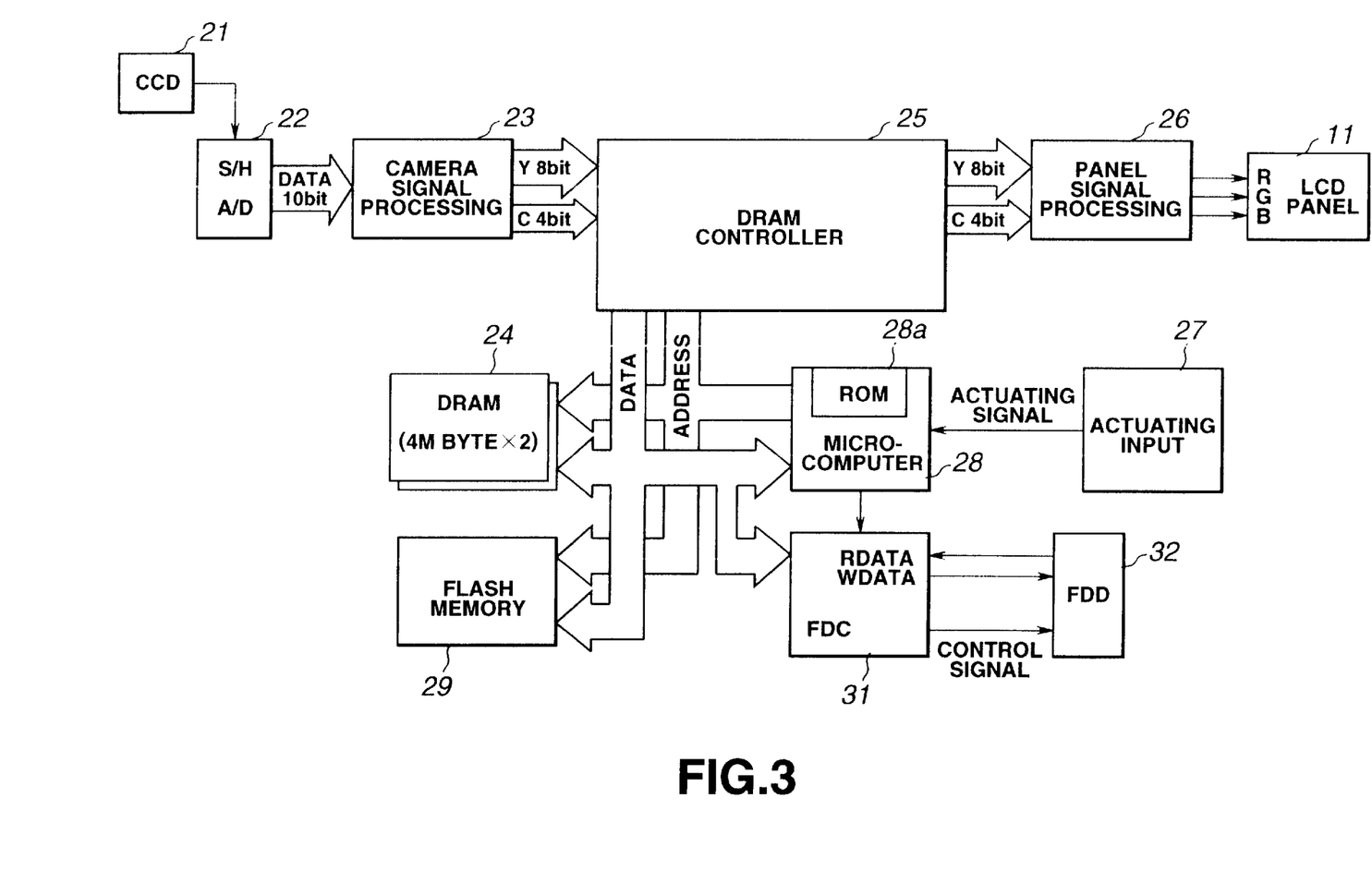
FIG. 3 is a block diagram for illustrating the circuit structure of the digital camera device.

The circuit configuration of the digital camera device 1 is hereinafter explained. Referring to FIG. 3, the present digital camera device 1 includes a CCD 21, as a photographing element, a sample-and-hold/analog-to-digital conversion circuit, abbreviated hereinafter to a sample-and-hold circuit 22, a camera signal processing circuit 23, a DRAM 24 and a DRAM controller 25. The digital camera device 1 also includes a panel signal processing circuit 26 for furnishing RGB signals to the LCD panel 11, an actuating input unit 27, a micro-computer 28, a floppy disc controller or FDC 31 and the floppy disc drive or FDD 32, already explained with reference to FIG. 2. The digital camera device 1 also includes a flash memory 29 as an additional constituent element. The DRAM 24, DRAM controller 25, microcomputer 28, flash memory 29 and the FDC 31 are interconnected over a common bus.

In the digital camera device 1, light rays from an object are passed through the objective lens 4 and received by the CCD 21 so as to be thereby converted into electrical signals. An output signal from the CCD 21 is sample-held by the sample-and-hold circuit 22 and subsequently converted by A/D conversion into 10-bit digital signals. The converted 10-bit signals are sent to the camera signal processing circuit 23.

The camera signal processing circuit 23 processes the 10-bit digital signals supplied from the sample-and-hold circuit 22 in a pre-set manner to output the processed signals to the DRAM controller 25. The camera signal processing circuit 23 in the present embodiment generates 8-bit luminance signals Y and 4-bit chroma signals C from the input signal to output the signals Y and C to the DRAM controller 25.

The DRAM controller 25 directly sends the luminance signals Y and the chroma signals C from the camera signal processing circuit 23 to the panel signal processing circuit 26. If the CCD 21 is not of the tetragonal lattice structure, the camera signal processing circuit 23 forms the luminance signals Y and the chroma signals C into the signals of the tetragonal lattice structure to send the resulting signals to the panel signal processing circuit 26, which then generates red signals R, green signals G and blue signals B from the input luminance signals Y and chroma signals C to output the R, G and B signals to the LCD panel 11. This displays an image of the photographing object on the LCD panel 11.

The DRAM controller 25 also causes the luminance signals Y and the chroma signals C from the camera signal processing circuit 23 in pre-set areas of the DRAM 24 under control from the camera signal processing circuit 23. The DRAM 24 is made up of two 4 MB DRAMs, and thus has a storage area of 8 MBs.

The actuating input unit 27 detects the actuation contents of the shutter button 3 and the actuating buttons/switches 12a to 12g to output the detected signals as actuating signals to the micro-computer 28.

The micro-computer 28 is of the reduced instruction set computer RISC type capable of high-speed processing, and includes a read-only memory (ROM) 28a holding on memory the software program designed for controlling the respective blocks. The micro-computer 28 is responsive to actuating signals from the actuating input unit 27 to cause the software program in the ROM 28a to be executed to perform the processing such as picture compansion or file management during the photographing, reproduction and editing.

Specifically, the micro-computer 28 causes the luminance signals Y and the chroma signals C to be stored during photographing of an object in a pre-set area of the DRAM 24 from the DRAM controller 25 in order to compress the stored luminance signals Y and chroma signals C in accordance with the JPEG (Joint Photographic Coding Experts Group) system. The micro-computer 28 also causes the data compressed in accordance with the JPEG system to be written in an area different from the above-described area of the DRAM 24 as JPEG stream data. The micro-computer 28 also causes JPEG stream data to be read out from the DRAM 24 to convert the JPEG stream data into MOS-DOS (Microsoft Disc Operating System, a trademark owned by Microsoft Inc.) format data to supply the converted data to the FDC 31. The micro-computer 28 controls the FDC 31 in order to write the data converted into the MS-DOS format data on a magnetic disc 9 of the floppy disc cartridge 8 loaded on the floppy disc drive 32.

The flash memory 29 is used for storage of the version-up program in case of version-up of the function of the digital camera device 1, and represents an additional constituent element in the present embodiment.

Figure 4:
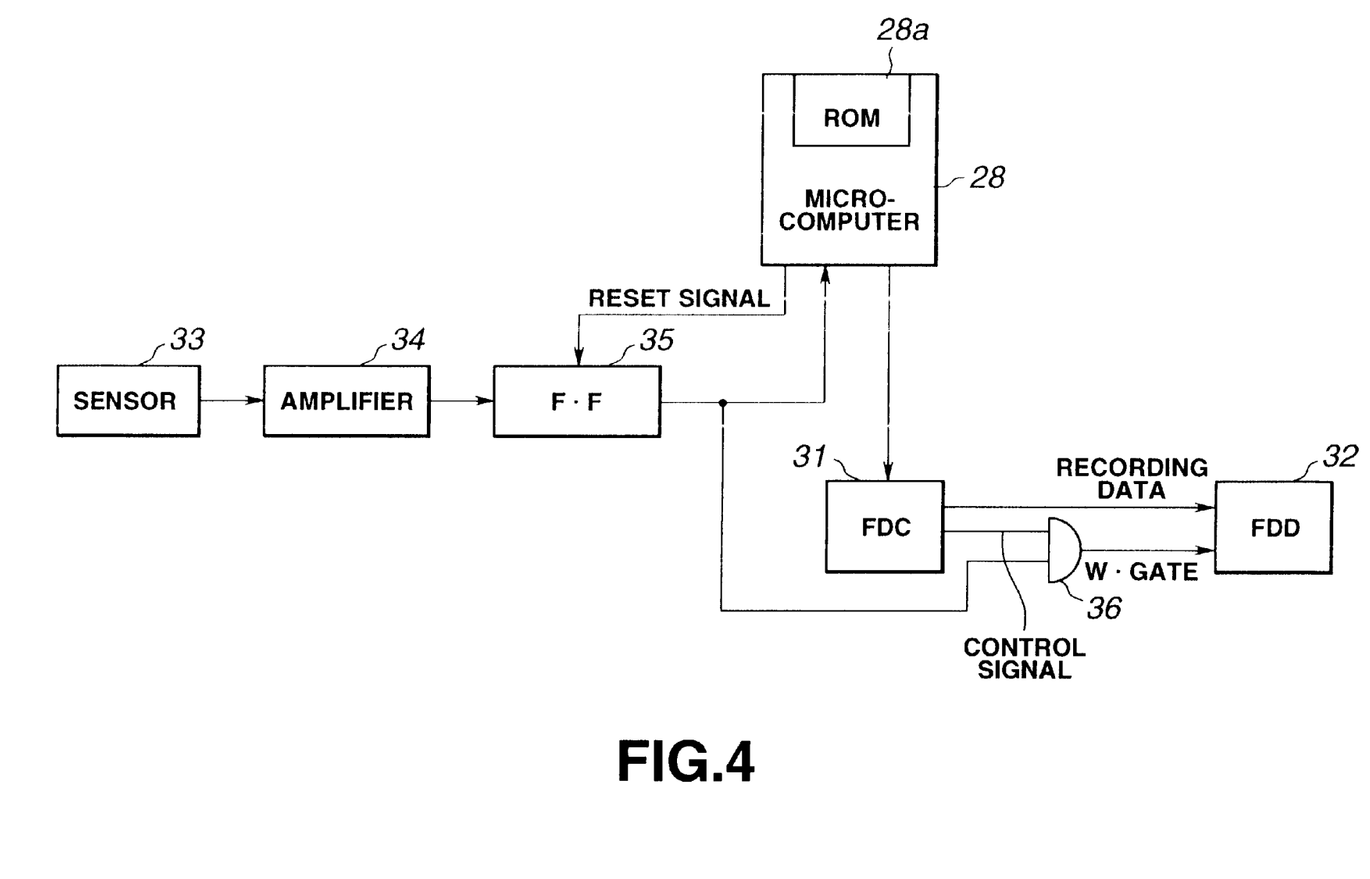
FIG. 4 is similarly a block diagram for illustrating the circuit structure of the digital camera device.

Moreover, the digital camera device 1 includes an acceleration sensor 33 for detecting the impact from outside, an amplification circuit 34 for amplifying an output signal from the acceleration sensor 33 and a flip-flop 35 for setting an output signal from the amplification circuit 34, as shown in FIG. 4. The acceleration sensor 33 outputs a detection signal in case of detection of an impact exceeding a pre-set G-value in a manner as will be explained in detail subsequently.

An output of the flip-flop 35 is supplied not only to the micro-computer 28 but also to the floppy disc drive 32 via one of input terminals of an AND gate 36. The micro-computer 28 also outputs a reset signal to the flip-flop 35.

The AND gate 36 has its opposite side input terminal connected to an output side of the FDC 31 for control signals and has its output terminal connected to the floppy disc drive 32 so as to perform the function as a gate (W gate) for issuing a permit/non-permit command for the recording operation by the floppy disc drive 32, as shown in FIG. 4. The acceleration sensor 33 will be explained in detail subsequently.

Figure 5:
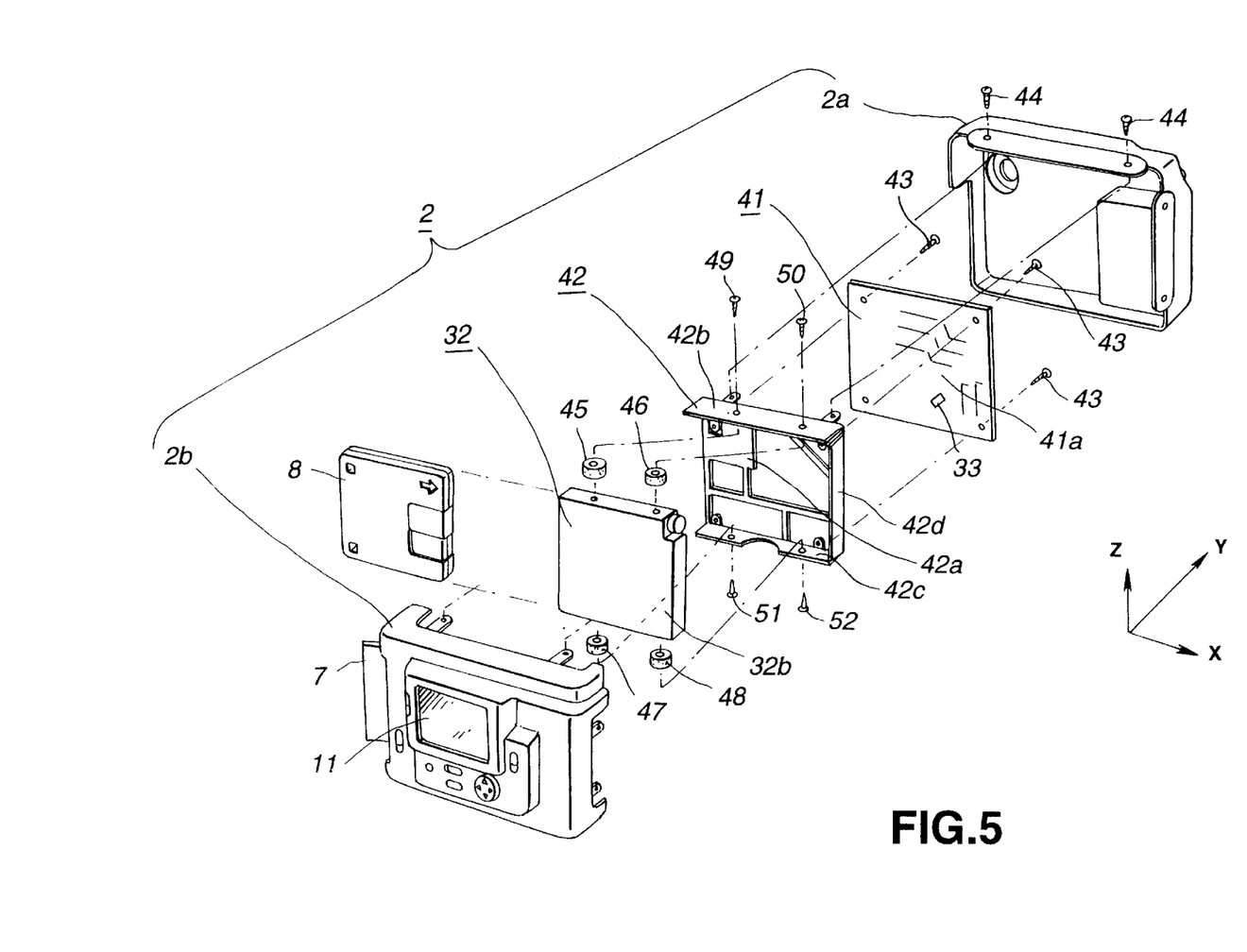
FIG. 5 is an exploded perspective view for illustrating the mechanical structure of the digital camera apparatus.

The internal mechanical structure of the digital camera device 1 is now explained. Referring to FIG. 5, the casing 2 of the digital camera device 1 can be exploded into a front side half 2a and a rear side half 2b. In these front and rear side halves 2a and 2b are arranged a circuit substrate 41, a chassis 42 and the floppy disc drive 32 as explained with reference to FIG. 3. Specifically, the circuit substrate 41, chassis 42 and the floppy disc drive 32 are in the form of substantially co-extensive rectangles and arranged in the inside of the casing 2 so that the rectangles overlap with one another.

More specifically, the circuit substrate 41 has its four corners secured by plural set screws 43 on one of the major surfaces of the chassis 42 facing the front side half 2a, as shown in FIG. 5. Also, the floppy disc drive 32 is mounted via four buffer members 45, 46, 47 and 48 for facing the opposite side major surface of the chassis 42 facing the rear side half 2b. The chassis 42, carrying the circuit substrate 41 and the floppy disc drive 32, is secured to the front side half 2a of the casing 2 by set screws 44 from the upper side and from the lateral side by set screws, not shown.

Figure 6:
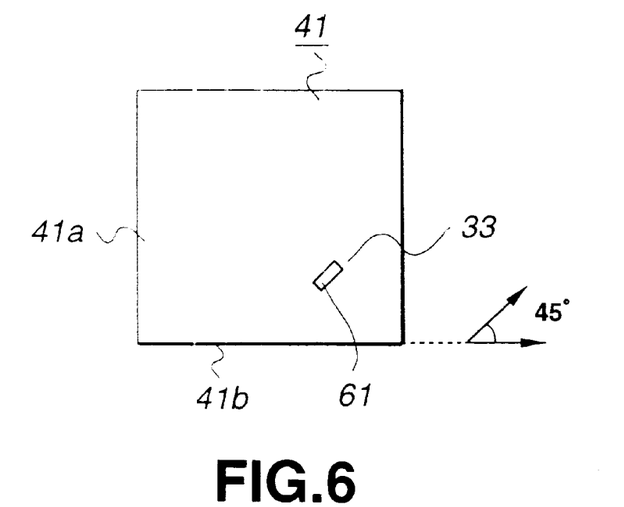
FIG. 6 is a diagrammatic view showing the mounting angle on the circuit substrate of an acceleration sensor.

The circuit substrate 41 is substantially rectangular in shape in its entirety and has a variety of chips, such as LSIs, operating as blocks of the circuit shown in FIGS. 3 and 4. On the major surface 41a of the circuit substrate 41 facing the rear side half 2b is mounted the acceleration sensor 33 having a substantially rectangular profile, as shown in FIG. 6, the acceleration sensor 33 is as explained with reference to FIG. 4. Specifically, the acceleration sensor 33 is mounted at an approximately lower rightward side of the major surface 41a of the circuit substrate 41 so that the long side of a substantially rectangular casing 61 is at an angle of approximately 45° relative to a lower side 41b of the circuit substrate 41, as shown in FIG. 6. The acceleration sensor 33 will be explained further in detail subsequently.

The chassis 42 is molded from metal, such as stainless steel, and has its major surface 42a recessed significantly. An upper flange 42b, a lower flange 42c and a side flange 42d are formed from the upper edge, lower edge and the right-side edge (FIG. 5) of the major surface 42a of the chassis 42, respectively, in a direction facing the rear side half 2b.

The floppy disc drive 32 is of a thin type f a so-called ½ height having a casing 32 of metal. This floppy disc drive 32 is mounted on the chassis 42 by set screws via the four buffer members 45, 46, 47 and 48. Specifically, the upper flange 42b and the lower flange 42c of the chassis 42 and the buffer members 45 to 48 are provided with bores adapted to be passed through by set screws 49 to 52. These set screws 49 to 52 are passed through these bores and screwed into tapped holes formed in the corresponding positions of the floppy disc drive 32 for securing the floppy disc drive 32 to the chassis 42.

Figure 7:
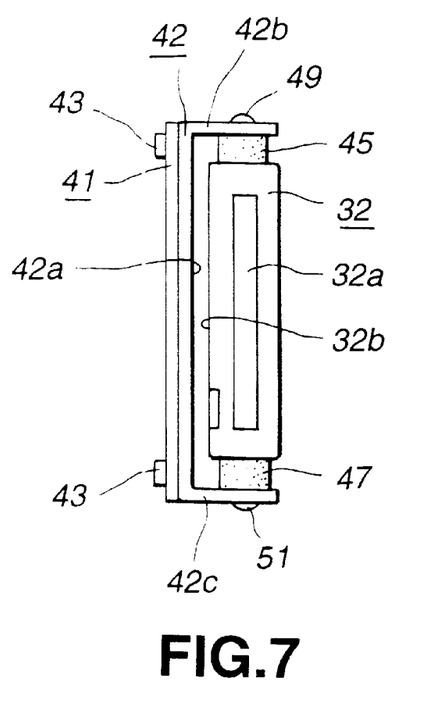
FIG. 7 illustrates the mounting state of the circuit substrate and the floppy disc drive on the chassis looking from a cartridge inserting opening.

Referring to FIG. 7, showing the mounting state of the circuit substrate 41 and the floppy disc drive 32 to the chassis 42 looking from the side of the cartridge inserting opening 32a, the casing 32b of the floppy disc drive 32 is not directly contacted with the major surface 42a of the chassis 42, such that the vibrations or impacts applied to the chassis 42 are transmitted via the buffer members 45 to 48 to the floppy disc drive 32. As for the relation between the chassis 42 and the circuit substrate 41, since the circuit substrate 41 has its four corners secured to the major surface 42a of the chassis 42 by set screws 43, the vibrations or impacts applied to the chassis 42 are directly transmitted to the circuit substrate 41.

The buffer members 45 to 48 function to delay the time which elapses until the impact applied to the casing 2 from outside is transmitted to the floppy disc drive 32, and are formed of a relatively soft material, such as rubber, sponge, silicon or soft plastics. The buffer members 45 to 48 also function to weaken the impact applied to the casing 2 to some extent to transmit the thus weakened impact to the floppy disc drive 32.

In the present embodiment, the floppy disc drive 32 and the casing 2 are interconnected via the chassis 42. Alternatively, the floppy disc drive 32 and the casing 2 may also be interconnected without interposition of the chassis 42. In this case, it suffices if the casing 2 is provided with bores for traversing by the set screws 49 to 52 and the floppy disc drive 32 is mounted on the casing via the buffer members 45 to 48 by inserting the set screws 49 to 52 into these bores.

Figure 8:
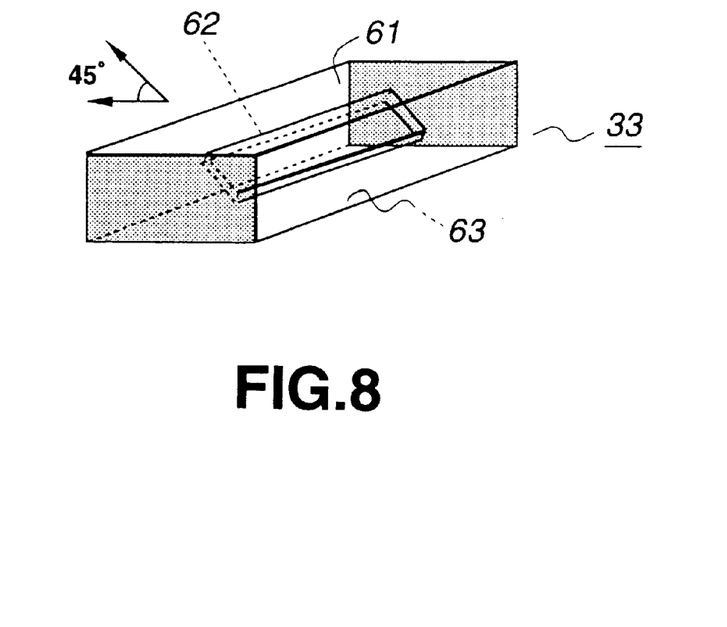
FIG. 8 is a see-through perspective view for illustrating the structure of the acceleration sensor.
Figure 9:
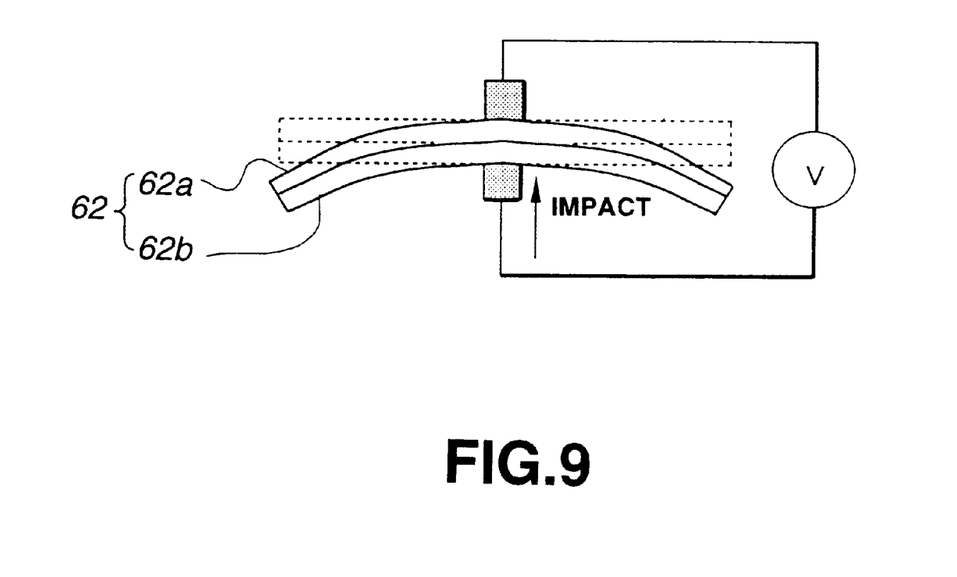
FIG. 9 illustrates the operation of the acceleration sensor in case of impact application.

Referring to the see-through perspective view of FIG. 8, an impact detection plate 62 for detecting the impact is arranged in the inside of the casing 61 of the acceleration sensor 33. This impact detection plate 62 is substantially rectangular in profile in its entirety. Specifically, the impact detection plate 62 is formed as a thin girder by two piezo-electric ceramic plates 62a, 62b having electrodes at mid positions on its major surface, as shown in FIG. 9. The impact detection plate 62 has its longitudinal ends secured within the casing 61 and has the mid portions of the major surface thereof movable within the casing 61. Thus, if an impact is applied in the in-plane direction of the impact detection plate 62, this impact detection plate 62 is warped arcuately to issue a signal proportionate to the intensity of the applied impact.

This impact detection plate 62 is arranged in the inside of the casing 61 so that its long sides are parallel to the long side of the casing 61 and so that its both major surfaces are inclined at an angle of 45° to the bottom surface 63 of the casing 61, as shown in FIG. 8. The bottom surface 63 represents the attachment surface to the circuit substrate 41.

By mounting the acceleration sensor 33 so that the long side of the casing 61 is inclined 45° relative to the lower side 41b of the major surface 41a of the circuit substrate 41, as shown in FIG. 6, impacts applied from a variety of directions can be detected. Meanwhile, it has been confirmed experimentally that, by mounting the acceleration sensor 33 at this angle, impact detection signals of a uniform strength an be obtained without regard to the direction of application of the impacts. That is, in the digital camera device 1, since the acceleration sensor 33 is mounted so that the major surface of the impact detection plate 62 of the acceleration sensor 33 will be approximately at an angle of 45° relative to the three axes X, Y and Z shown in FIG. 5 in case the casing 2 is used in the basic position shown in FIGS. 1 and 2, the impacts from the axial directions of X, Y and Z can be detected uniformly, such that a sufficient function can be manifested by a sole acceleration sensor.

Figure 10A:
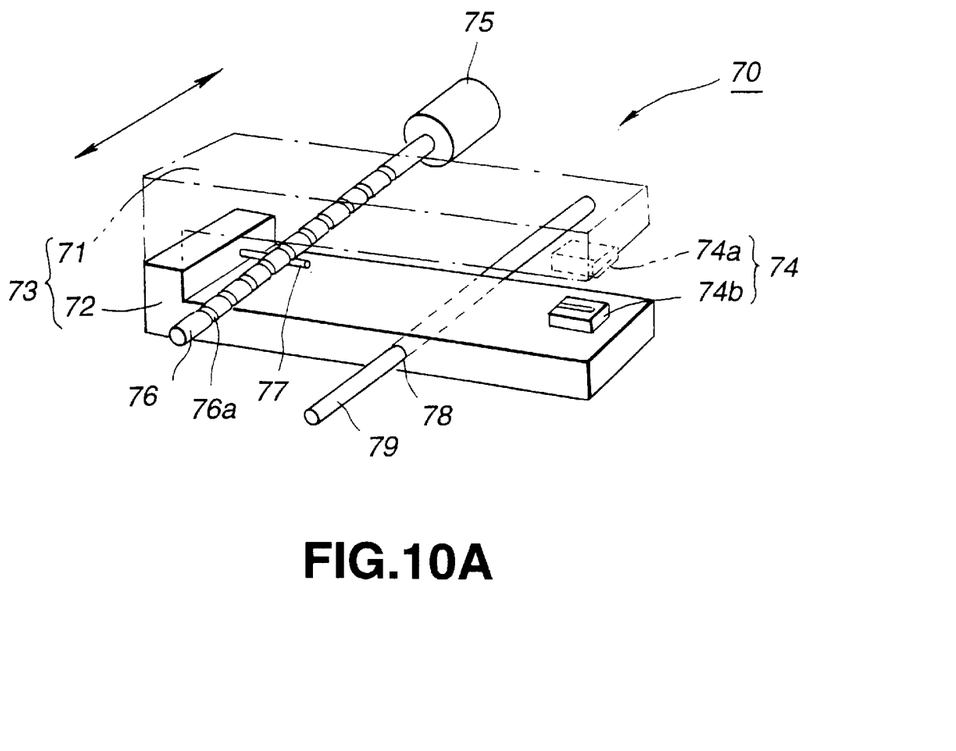
FIG. 10 illustrates the structure of a magnetic head arranged in the inside of the casing of the floppy disc drive.

FIG. 10 shows the mechanism around a magnetic head arranged in a casing 32b of the floppy disc drive 32. Within the casing 32b of the floppy disc drive 32 is mounted a head actuator 70, as shown in FIG. 10A. This head actuator 70 includes a head arm 73 formed as-one with upper and lower arm members 71, 72, upper and lower magnetic heads 74 (74a, 74b) mounted on the distal ends of the arm members 71, 72, a feed motor 75 for moving the head arm 73 and a feed screw 76 mounted on a rotor of the feed motor 75. The head actuator 70 also includes a pin 77 mounted on the distal end of the arm member 73 for engagement with a spiral groove 76a formed in the feed screw 76 and a guide shaft 79 mounted in a through-hole 78 formed in the arm member 72 for guiding the movement of the head arm 73.

Figure 10B:
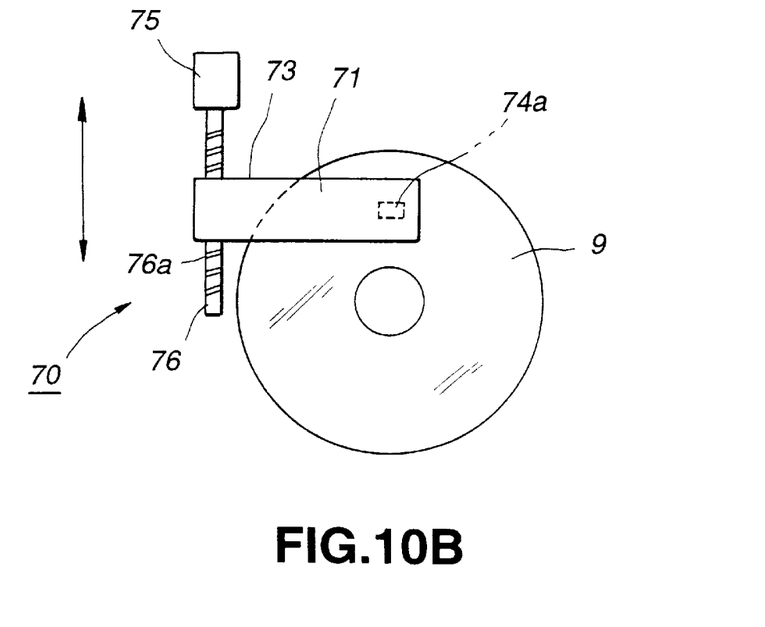

The arm members 71, 72 are molded from, for example, synthetic resin, and has upper and lower paired magnetic heads 74, 74 at the distal ends thereof, these magnetic heads being positioned on both sides of the major surfaces of the magnetic disc 9, as shown in FIG. 10B. Although not shown, a spindle motor for rotationally driving the magnetic disc 9 is mounted below the mid position of the major surface of the magnetic disc 9.

With the above-described head actuator 70, the magnetic head 74 is slid against the major surface of the magnetic disc 9, run in rotation by the spindle motor, for applying a magnetic field on the recording track of the magnetic disc or detecting magnetic signals recorded on the recording track of the magnetic disc in order to record or reproduce main picture data or thumbnail picture data.

The head arm 73 of the head actuator 70 is reciprocated along a guide shaft 79 in the radial direction of the guide shaft 79, that is in the direction indicated by arrow in FIGS. 10A and 10B. Specifically, when the feed motor 75 is rotated a pre-set rotational angle, the head arm 73 is moved track-by-track on the recording tracks formed on the magnetic disc 9. If a strong impact is applied to the floppy disc drive 32 in its entirety, the casing 32b or the head arm 73 is flexed to cause position offset of the magnetic heads 74a, 74b relative to the recording track of the magnetic disc 9, or failure in contact, thus causing erosion of neighboring tracks during data recording or otherwise causing failure in writing on the current track.

In the case of the 3.5 inch ½ height floppy disc drive, as described above, it has been found by experiments that the G-value of occurrence of writing errors for the current recording tracks is 3 G to 12 G, with the G-value of occurrence of the erosion to the neighboring tracks being not less than 50 G. It is therefore reasonable to select the setting value for impact detection of the acceleration sensor 33 to not less than approximately 50 G for preventing erosion to the neighboring tracks and to select the setting value for impact detection of the acceleration sensor 33 to a suitable value ranging between 3 and 12 G for preventing error occurrence for the current track as well. It has been found by experiments that an optimum result can be obtained with the present digital camera device 1 by selecting the setting value for impact detection of the acceleration sensor 33 to 7 G to 8 G, in particular to approximately 8 G.

Figure 11:
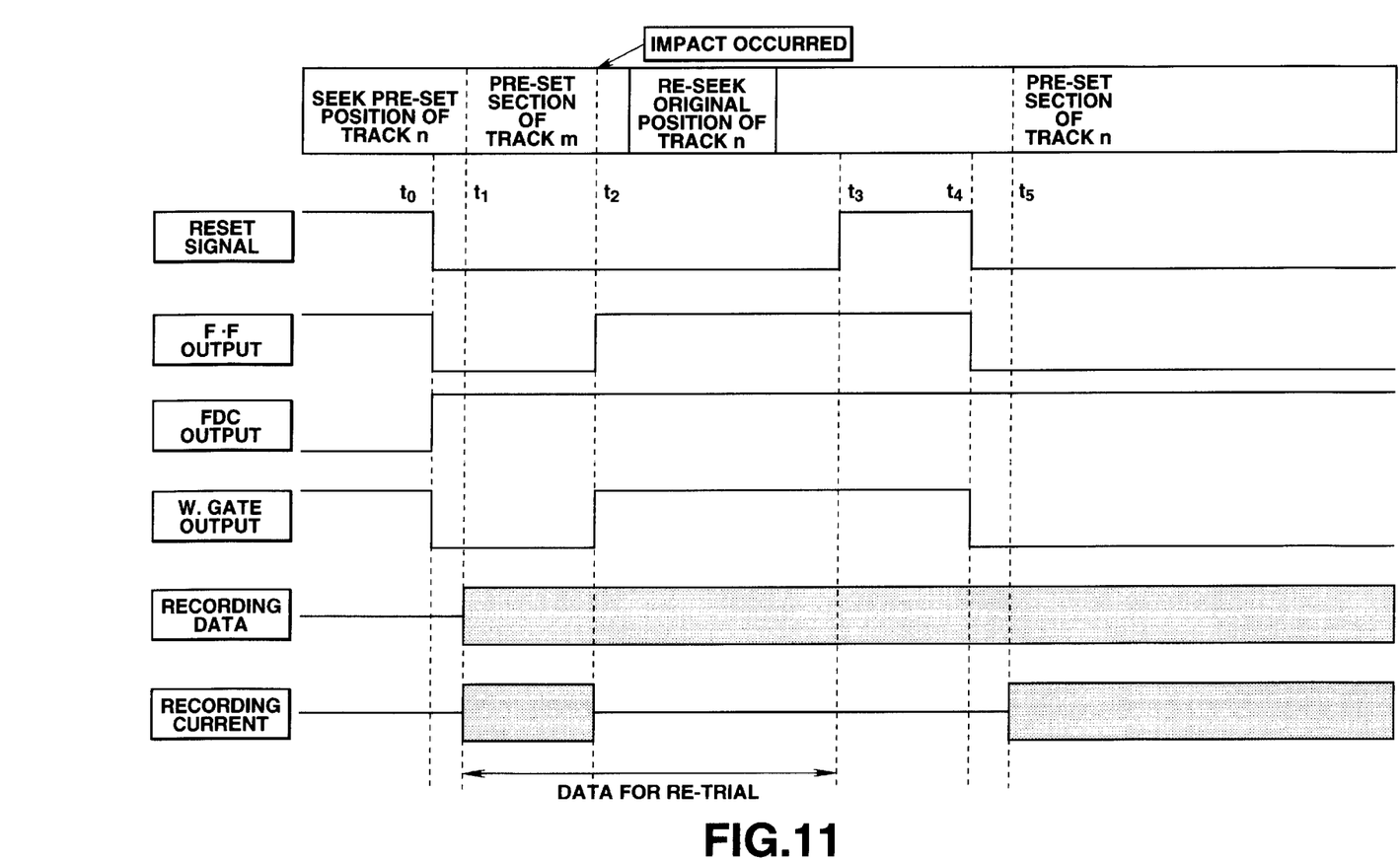
FIG. 11 is a timing chart for illustrating the operation of the acceleration sensor, flip-flop, AND gate, micro-computer and the floppy disc and the processing of recorded data.

The operation of the acceleration sensor 33 and the floppy disc drive 32 in case an impact is applied to the casing 2 of the digital camera device 1 from outside is no explained with reference to FIG. 11.

In the digital camera device 1, the track number and the sector number on the magnetic disc 9 for recording are set by the micro-computer 28 shown in FIG. 4 prior to proceeding to recording respective data. The track number is herein set to n. The micro-computer 8 then controls the FDC31 to move the magnetic head 74 to the track and sector positions by way of the seek operation.

At a time point $t_0$ corresponding to the end of the seek operation, the micro-computer 28 outputs a reset signal to the flip-flop 35 to reset the output of the flip-flop 35, at the same time as a control signals is outputted from the FDC 31 to invert the output signal of the AND gate 36 to permit the data recording in the FDD 32.

Then, recording data is supplied from the FDC 31 to the floppy disc drive 32 to supply the recording current to the magnetic head 74 so that recording data is written on pre-set sectors of the track n as from time $t_1$. The time between $t_0$ and $t_1$ stands for the rise time until coming into operation of the floppy disc drive 32.

If an impact exceeding e.g., 8 G is produced at time $t_2$, this impact is sequentially transmitted from the casing 2 via chassis 42, circuit substrate 41 and the acceleration sensor 33, which then outputs an impact detection signal. This detection signal from the acceleration sensor 33 is amplified by the amplification circuit 34 and thence supplied to the flip-flop 35 to invert the output thereof. The inverted output signal of the flip-flop 35 is sent to the micro-computer 28 and to the AND gate 36. This complements the output signal of the AND gate 36 to close the gate of the control signals from the FDC 31 for the floppy disc drive 32. Thus, the control current ceases to be supplied as from time $t_2$ to the recording head 74 of the floppy disc drive 32.

Since the chassis 42 and the floppy disc drive 32 are interconnected via buffer members 45 to 48 adapted for delaying the impact transmission, this impact is transmitted at a timing delayed from the transmission timing to the acceleration sensor 33, herein a pre-set timing delayed from time $t_2$. Since no recording current is supplied at this timing to the magnetic head 74 of the floppy disc drive 32, it becomes possible to prevent erosion to neighboring tracks or failure in writing in the current track even on occurrence of detracking of the magnetic head 74 by impacts.

That is, in the present embodiment, since the time when the impact applied to the casing 2 is transmitted to the floppy disc drive 32 can be retarded, the impact applied to the acceleration sensor 33 can be relatively quickened thus compensating for the time delay required for interrupting the recording current. In particular, if the casing 2 or the chassis 42 is of high tenacity, the speed at which the impact is transmitted to the magnetic head 74 of the floppy disc drive 32 is increased significantly, such that the recording current interruption after detection of the acceleration sensor 33 cannot be achieved in time. In such case, it is highly effective to interconnect the floppy disc drive 32 and the casing 2 with interposition of the buffer members 45 to 48 since the impact transmission timing can then be retarded to permit the function of the acceleration sensor 33 to be performed more effectively.

It has been confirmed experimentally that, in the present embodiment, the time until the impact applied to the casing 2 is transmitted to the floppy disc drive 32 is 11 msec±5 msec.

If an output signal of the flip-flip 35, complemented on occurrence of the impact, is fed to the micro-computer 28 at time $t_2$, the micro-computer 28 outputs a control signal to the FDC 31 to move the magnetic head 74 to an original track of the track n by way of re-seeking control.

At a time $t_3$ when the re-seeking comes to a close, a reset signal is outputted to the flip-flop 35. The output signal of the flip-flop 35 is complemented at time $t_4$ corresponding to the decay time of the reset signal, this complemented signal being sent to the micro-computer 28 and to the AND gate 36. By the complemented output signal being sent to the AND gate 36, the output signal of the AND gate 36 is complemented at this time $t_4$ to open the gate to permit data recording by the floppy disc drive 32.

The micro-computer 28 then controls the FDC 31 to supply the recording data from the FDC 31 to the floppy disc drive 32, with the recording data as from the recording start time $t_1$ as the re-trial data. This furnishes the recording current for the re-trial data to the recording head 74 of the floppy disc drive 32 as from time $t_5$, as shown in FIG. 11, thus causing the recording data to be written as from the preset sector of the track n. Meanwhile, the time interval since time $t_4$ until time $t_5$ is the rise time until actuation of the floppy disc drive 32.

What is claimed is:

1. A portable data recording device for recording data on a disc-shaped recording medium, comprising:
   a disc drive for recording data on the disc-shaped recording medium with a head unit for recording data and a head actuator unit for positioning said head unit, said disc drive being provided inside a casing;
   a single acceleration sensor mounted to said casing for detecting an impact applied to said casing; and
   control means for controlling said disc drive for discontinuing data recording on said disc-shaped recording medium and for controlling said head actuator unit to start a re-seeking movement for moving said head unit to a starting position of a sector in which an impact is detected if the impact exceeding a pre-set value is detected based on detection results from said accelerator sensor,
   wherein said single acceleration sensor includes an impact detection plate molded substantially in the shape of a rectangular plate and is arranged so that the major surface of the impact detection plate is inclined at an angle of substantially 45° relative to three orthogonal axes, a first axis of the three orthogonal axes being along a direction parallel to a moving direction of said head unit, and a second axis being along a direction normal to the major surface of said disc-shaped recording medium that is disposed in said disc drive.

2. The data recording device as claimed in claim 1 wherein said control means controls the recording means for discontinuing data recording on the disc-shaped recording medium if an impact not less than 3 G to 12 G is detected based on detection results from the acceleration sensor.

3. The data recording device as claimed in claim 1 wherein said casing comprises a chassis and a circuit substrate mounted to said chassis, and wherein said acceleration sensor is mounted to said circuit substrate.

4. The data recording device as claimed in claim 1 further comprising buffer members interposed between said floppy disk drive and said casing for delaying transmission of the impact.

5. A camera device for recording data on a disc-shaped recording medium, comprising:
   a disc drive for recording image data on the disc-shaped recording medium with a head unit for recording data and a head actuator unit for positioning said head unit, said disc drive being provided in inside a casing;
   a single acceleration sensor mounted to said casing for detecting an impact applied to said casing; and
   control means for controlling said disc drive for discontinuing data recording on said disc-shaped recording medium and for controlling said head actuator unit to start a re-seeking movement for moving said head unit to a starting position of a sector in which an impact is detected if the impact exceeding a pre-set value is detected based on detection results from said accelerator sensor, wherein
   said single acceleration sensor includes an impact detection plate molded substantially in the shape of a rectangular plate and is arranged so that the major surface of the impact detection plate is inclined at an angle of substantially 45° relative to three orthogonal axes, a first axis of the three orthogonal axes being along a direction parallel to a moving direction of said head unit, and a second axis being along a direction normal to the major surface of said disc-shaped recording medium that is disposed in said disc drive.

6. The camera device as claimed in claim 5 wherein said control means controls the recording means for discontinuing data recording on the disc-shaped recording medium if an impact not less than 3 G to 12 G is detected based on detection results from the acceleration sensor.

7. The camera device as claimed in claim 5 wherein said casing comprises a chassis and a circuit substrate mounted to said chassis, and wherein said acceleration sensor is mounted to said circuit substrate.

8. The camera device as claimed in claim 5 further comprising buffer members interposed between said floppy disk drive and said casing for delaying transmission of the impact.

9. A method of discontinuing the recording of data in a portable data recording device for recording data on a disc-shaped recording medium, comprising:
   recording data on the recording medium using a disc drive having a head unit, the disc drive being provided inside a casing;
   detecting an impact applied to the casing by a single acceleration sensor mounted to the casing, said acceleration sensor including an impact detection plate arranged such that the major surface of said impact detection plate is inclined at an angle of substantially 45°0 relative to three orthogonal axes, a first axis of the three orthogonal axes being along a direction parallel to a moving direction of said head unit, and a second axis being along a direction normal to the major surface of said disc-shaped recording medium that is disposed in said disk drive; and
   controlling the disc drive to discontinue data recording on the recording medium and start a re-seeking movement by moving the head unit to a starting position of a sector of the recording medium in which an impact is detected if the impact detected by the acceleration sensor exceeds a pre-set value.

10. The method as claimed in claim 9, wherein said portable data recorder device comprises a camera device and said recording comprises recording image data on the recording medium.

* * * * *

UNITED STATES PATENT AND TRADEMARK OFFICE
CERTIFICATE OF CORRECTION

PATENT NO. : 6,404,981 B1 Page 1 of 1
DATED : June 11, 2002
INVENTOR(S) : Atsuhiro Kumagai and Satoshi Kato It is certified that error appears in the above-identified patent and that said Letters Patent is hereby corrected as shown below:

Column 1,
Line 10, "investigated" should read -- been investigations --.

Column 3,
Line 37, "n" should read -- on --.

Column 5,
Line 58, after "6" insert -- . --.
Line 58, "the" should read -- The --.

Column 6,
Line 5, "f" should read -- of --.

Column 7,
Line 7, "an" should read -- can --.
Line 13, after "5" insert -- . --.
Line 13, "in" should read -- In --.
Line 33, "has" should read -- have --.

Column 8,
Line 12, delete the word "no".
Line 19, "FDC31" should read -- FDC 31 --.
Line 24, "signals" should read -- signals --.

Column 10,
Line 12, delete the word "in".
Line 58, after "45°" delete "0".

Signed and Sealed this

Twenty-fifth Day of February, 2003

JAMES E. ROGAN
*Director of the United States Patent and Trademark Office*